(12) United States Patent
Edwards et al.

(10) Patent No.: US 9,280,595 B2
(45) Date of Patent: Mar. 8, 2016

(54) APPLICATION QUERY CONVERSION

(75) Inventors: Catherine A. Edwards, San Francisco, CA (US); Natalia Hernandez-Gardiol, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 603 days.

(21) Appl. No.: 13/599,722

(22) Filed: Aug. 30, 2012

(65) Prior Publication Data
US 2014/0067846 A1 Mar. 6, 2014

(51) Int. Cl.
*G06F 17/30* (2006.01)

(52) U.S. Cl.
CPC .................................. *G06F 17/3064* (2013.01)

(58) Field of Classification Search
CPC .................................................. G06F 17/3064
See application file for complete search history.

(56) References Cited

U.S. PATENT DOCUMENTS

| | | | |
|---|---|---|---|
| 8,688,728 B2 * | 4/2014 | Wilkinson | 707/767 |
| 8,812,531 B2 * | 8/2014 | Hagar et al. | 707/765 |
| 2004/0064447 A1 * | 4/2004 | Simske et al. | 707/5 |
| 2005/0071255 A1 * | 3/2005 | Wang et al. | 705/27 |
| 2008/0147638 A1 * | 6/2008 | Hoeber et al. | 707/5 |
| 2011/0288941 A1 * | 11/2011 | Chandra et al. | 705/14.73 |
| 2012/0158738 A1 * | 6/2012 | Buehrer et al. | 707/748 |
| 2012/0254161 A1 * | 10/2012 | Zhang et al. | 707/723 |
| 2013/0151538 A1 * | 6/2013 | Dmitriev et al. | 707/750 |

OTHER PUBLICATIONS

April Kontostathis & William M. Pottenger, "Detecting Patterns in the LSI Term-Term Matrix", 2002, Proceedings of the ICDM 2002 Workshop on Foundations of Data Mining and Discovery, 6 pages.*
Anindya Datta et al., "Mobilewalla: A Mobile Application Search Engine", Oct. 24-27, 2011, Third International Conference, MobiCASE, pp. 172-187.*
Merriam-Webster.com, Online Dictionary Definition of "empirical", retrieved on Nov. 28, 2015.*

* cited by examiner

*Primary Examiner* — Scott A Waldron
(74) *Attorney, Agent, or Firm* — Blakely, Sokoloff, Taylor & Zafman LLP

(57) ABSTRACT

A set of potential search-query terms can be identified based on empirical queries for apps. For each potential search-query term, a subset of documents within a set of documents can be identified based on apps that users were likely to click on or download following entry of a search query with a comparable or same term. One or more other indicator terms can be identified as being related to the potential search-query term based on the one or more second indicator terms being prevalent within the subset of documents. Upon receipt of a subsequent search query, a search can then be performed using both a term within the search query and one or more related other indicator terms.

26 Claims, 8 Drawing Sheets

| Compose | Message | Reply | Send | Draft | Account | Filter | Forward | Delete |

FIG. 5A

| Compose | Message | Reply | Send | Draft | Account | Filter | Forward | Delete |
|---------|---------|-------|------|-------|---------|--------|---------|--------|
| 0.21    | 0.15    | 0.18  | 0.09 | 0.02  | 0.04    | 0.01   | 0.01    | 0.03   |

FIG. 5B

|         | Email | Compose | Reply | Pool | Game | Friends | Score |
|---------|-------|---------|-------|------|------|---------|-------|
| Email   |       | 0.21    | 0.18  | 0    | 0    | 0.03    | 0     |
| Compose | 0.08  |         | 0.04  | 0    | 0    | 0.2     | 0     |
| Reply   | 0.15  | 0.05    |       | 0    | 0    | 0.01    | 0     |
| Pool    | 0     | 0       | 0     |      | 0.25 | 0.10    | 0.18  |
| Game    | 0     | 0       | 0     | 0.08 |      | 0.33    | 0.45  |
| Friends | 0.02  | 0.05    | 0.01  | 0.01 | 0.02 |         | 0.05  |
| Score   | 0     | 0       | 0     | 0.01 | 0.31 | 0.18    |       |

FIG. 5C

APPLICATION QUERY CONVERSION

BACKGROUND

The present disclosure relates generally to receiving a query for software applications and identifying one or more terms related to, but not included within, the query to use while searching a database. The related terms can be identified based on user interactions following similar or same queries.

In recent years, application software or "apps" have become increasingly popular. As professional and amateur developers develop apps at an impressive rate, a great variety of useful and/or amusing apps are available to users. However, the large number of apps also carries a substantial disadvantage, in that it can make it more difficult for a user to search for an app with a specific utility or function.

Users are limited in that they can only enter a finite number of words when entering a search query. Thus, even though they may wish to receive an app that relates to a complex concept, they must identify a relatively short number of search-query words in an attempt to briefly capture the concept. Many apps may have a title or description including one or more query terms. Meanwhile, frequently, most of these apps do not pertain to the concept that the user had in mind. Returning all apps with terms from the query may thus frustrate the user and waste his time.

Accordingly, it is desirable to provide systems and methods for performing searches extending beyond a purely textual search tied to search-query terms, such that more relevant apps can be identified and presented to a user.

SUMMARY

Embodiments described herein can efficiently and effectively respond to users' search queries. When a user searches for an application ("app"), he can enter one or more search-query terms. The user can select the query terms in an attempt to capture a concept related to a function of a desired app. Textual searches tied merely to the query terms can produce undesirable results, such as returning largely irrelevant apps or ranking the most suitable apps below others. Thus, embodiments of the subject application can identify one or more other terms related to the search-query terms and performs the app search or a ranking of identified apps using the other indicator terms.

The indicator terms can be identified by analyzing words in a set or subset of training documents associated with apps. In various embodiments, the set of training documents can include all available apps, a sampling of available apps, all apps available at a past time point, or a sampling of apps available at a past time point. Either the entire set or a subset of the training documents can be used to identify the indicator terms.

For example, a subset of documents can include documents responsive to a textual query using the search-query terms. As another example, a subset of documents can include documents which users interacted with (e.g., selected for more information or downloaded) following a query using comparable or same query terms. Related indicator terms can be defined as those frequently appearing throughout the set of documents. For example, related indicator terms may be those appearing at least one in a large fraction of the documents or those appearing more than a threshold number of times across the set.

In some instances, the entire set of documents (e.g., documents associated with all apps available to user) is analyzed in order to identify a relationship structure associated with a plurality of term pairs. Each pair can be assessed to estimate whether a given query term is related to a given indicator term. Terms in the relationship structure can be identified, e.g., as all noun and verb terms within the set of documents or terms appearing within the set more than a threshold number of times. A pairwise analysis between each identified term can be performed to quantify, e.g., the probability that one term of the pair will appear within a document given that the other term of the pair appears. When a user inputs a search query including query terms, related indicator terms can be identified based on terms associated with high relatedness metrics (e.g., based on frequent co-occurrence) with respect to one or more query terms.

By considering related indicator terms, search quality can be improved. Apps that have high term counts for a particular search-query term but include few or no related indicator terms can be eliminated from search results or assigned a low rank. Meanwhile, apps that have low term counts for a particular search-query term but include many related indicator terms can be returned in search results and/or highly ranked.

According to one embodiment, a method can be provided of responding to a search query requesting relevant software applications from a database storing software applications and a set of documents. Each document can be associated with a software application. A subset of documents within the set of documents based on empirical user actions can be identified with a server. The empirical user actions can involve selecting a software application in the subset in response to receiving results for queries including a first query term. A second indicator term that occurs within the subset of documents can be identified. A data structure can be updated with the server to associate the first query term with the second indicator term. The search query can be received at the server from an electronic device of a user. The search query can include the first query term. The data structure can be accessed with the server to identify the second indicator term associated with the first query term. Documents within the database can be searched with the server to identify relevant software applications based on the first query term and the second indicator term.

According to another embodiment, a computer product can be provided that includes a non-transitory computer readable medium storing a plurality of instructions that when executed control a computer system to respond to a search query requesting relevant software applications from a database storing software applications and a set of documents. Each document can be associated with a software application. The instructions can include identifying, with a server, a subset of documents within the set of documents based on empirical user actions. The empirical user actions can involve selecting a software application in the subset in response to receiving results for queries including a first query term. The instructions can also include identifying a second indicator term that occurs within the subset of documents and updating, with the server, a data structure to associate the first query term with the second indicator term. The instructions can further include receiving, at the server, the search query from an electronic device of a user, the search query including the first query term and accessing, with the server, the data structure to identify the second indicator term associated with the first query term. The instructions can still further include searching, with the server, documents within the database to identify relevant software applications based on the first query term and the second indicator term.

According to yet another embodiment, a method of defining a data structure to use for expanding a search query requesting relevant software applications from a database storing software applications and a set of documents, each document being associated with a software application. A subset of documents within the set of documents can be identified with a server based on empirical user actions. The empirical user actions can involve selecting a software application in the subset in response to receiving results for queries including a first query term. A set of second indicator terms can be identified. For each second indicator term, the server can determine how frequently the second indicator term occurs within the subset of documents and can define a relatedness metric between the first query term and the second indicator term based on the determined occurrence frequency. The data structure can be constructed that indicates the relatedness metric between the first query term and each second indicator term in the set of second indicator terms.

According to still another embodiment, method of defining a data structure to use for expanding a search query requesting relevant software applications from a database storing software applications and a set of documents can be provided. Each document can be associated with a software application. A set of N potential query terms can be identified with a server by analyzing words in the set of documents, N being an integer greater than 100. A co-occurrence matrix can be defined as an N×N array of matrix elements. Each row can correspond to a respective one of the N potential query terms and each column can correspond to a respective one of the N potential query terms. For each potential query term I, a subset of documents within the set of documents can be identified with the server in which the potential query term I exists. Further, for each of the N−1 other potential query terms, the subset of documents can be identified with the server to identify a respective number of times the respective other potential query term J occurs in the subset of documents and a co-occurrence score corresponding to matrix element (I,J) can be identified with the server based on the respective number. Thus, the co-occurrence matrix can be constructed with the server using the co-occurrence scores.

Other embodiments are directed to systems and computer readable media associated with methods described herein.

These and other embodiments of the invention along with many of its advantages and features are described in more detail in conjunction with the text below and attached figures.

BRIEF DESCRIPTION OF THE DRAWINGS

FIGS. 5A-5C are examples of relationship structures.

DETAILED DESCRIPTION

Certain embodiments of the present invention can expand or alter terms used while searching through documents in an app database. The app database can include subdatabases, such as a first subdatabase storing apps and a second subdatabase storing documents associated with the apps. A set of potential query terms can be identified based on frequently entered empirical query terms or based on terms (e.g., nouns and verbs) appearing in a set of app-related documents. For each potential query term, a subset of documents relevant to the term can be identified. For example, the subset can include all documents that include the potential query terms. As another example, the subset can include documents which users previously interacted with following a comparable or same query.

Using the subset, a data structure can be constructed. The data structure can include associations between each potential query term and one or more other terms. In some instances, the data structure includes a list of related indicator terms. In some instances, the data structure includes a list of related indicator terms, each related indicator term being associated with a score (e.g., the score depending on how frequently the related indicator term co-occurred with the potential query term in the subset). In the latter instance, the data structure can include a vector (e.g., associating one potential query term with multiple related indicator terms) or a matrix (e.g., associating each of a number of potential query terms with multiple other potential related indicator terms).

Subsequently, when a search query is received, related indicator terms can be identified based on the data structure. A database can be searched using the search-query terms, and, in some instances, using the related indicator terms. The database can include, e.g., the set of documents or a larger set. The search results can be ranked using a ranking algorithm, which can depend on the related indicator terms (e.g., ranking results higher if they include many related indicator terms). The ranked search results can then be presented to a user.

I. Introduction

Figure 1:
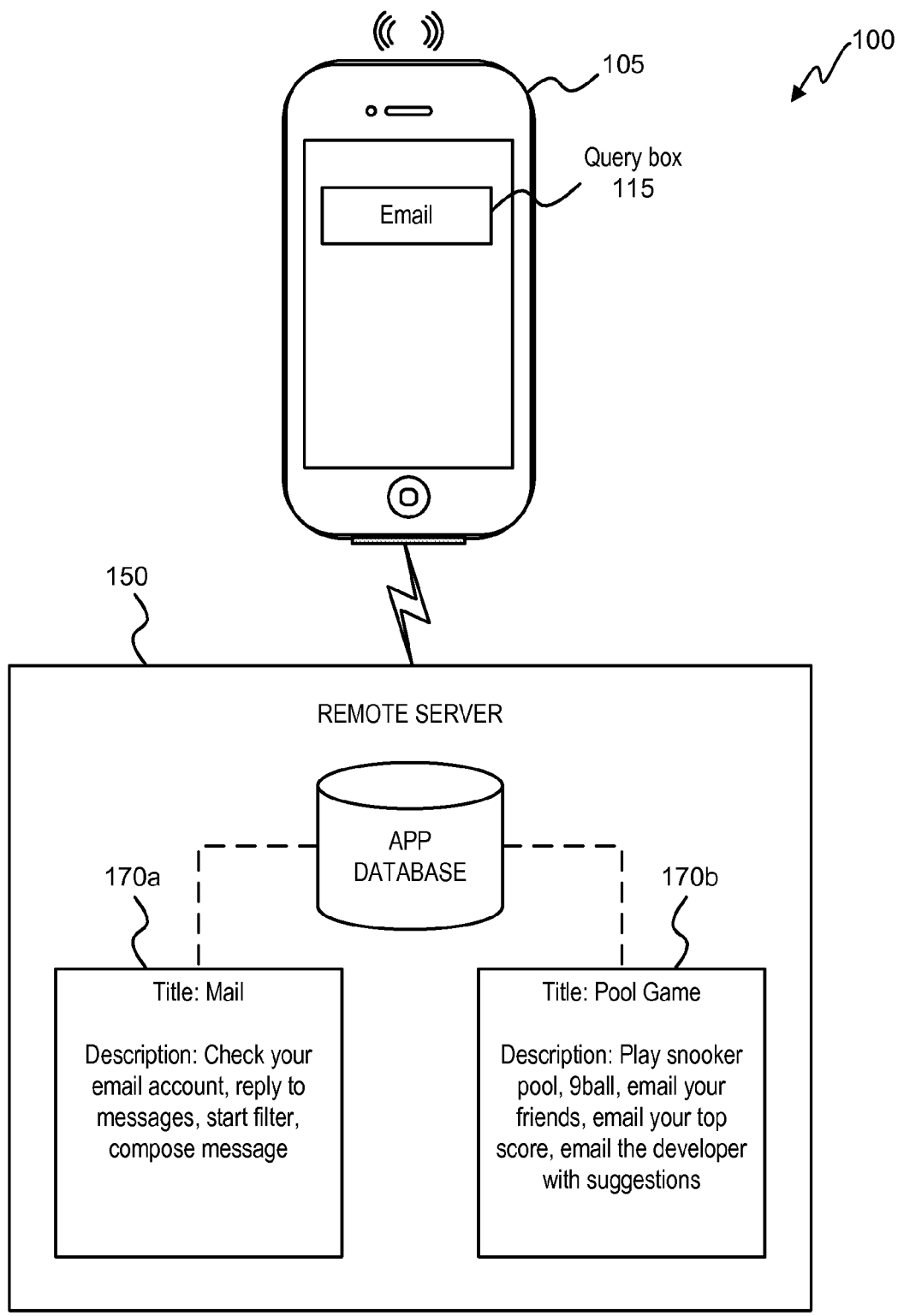
FIG. 1 illustrates a system for performing searches for apps.

FIG. 1 illustrates a system 100 for performing searches for apps. The searches can be performed at device 105. Device 105 can execute software, such as operating software or program software, that enables a user to perform an app search and receive results of the search (e.g., as a list). Device 105 can include mobile devices, which can include any device likely to be carried on a person of a user and capable of performing app searches as described herein. Device 105 can include an electronic device, mobile phone, smartphone, tablet computer, laptop computer, or desktop computer.

Using a user-input component, a user can input a search query into device 105. For example, a user can insert search-query terms using a touchscreen keypad, non-touchscreen keypad, touchscreen buttons, non-touchscreen buttons, or a mouse. Upon entry of the search query, the query can appear within a query box 115. In this illustration, a user of one mobile device 105 entered search-query text of "email."

The search query can be transmitted (e.g., wirelessly transmitted) from device 105 to a remote server 150. Remote server 150 can use query terms of the search queries to search for apps associated with data in an app database 160. App database 160 can include a dynamic database, in which data related to new apps are regularly or continuously added to the database. At least some apps can be contributed by third-party app developers.

App database 160 can include titles, descriptions, metadata, download frequency or count, user ranking, and/or the apps themselves. Some or all of this information can be included in an app document 170. FIG. 1 shows an example of two hypothetical app documents 170a and 170b. Each app document 170 pertains to a different app. App document 170a is associated with a "Best Mail" app, and app document 170b is associated with a "Pool Game" app. The app document includes a description. The description can be included, e.g., as metadata associated with the app. The description can be presented to users, such that users can decide whether to download the app.

The depicted example illustrates the problem with using a pure textual-based search technique using on search-query terms. In this instance, the Mail app document 170a includes the term "email" once in its title and description. Meanwhile, the pool game app document 170b includes the term "email" three times in its description. While the pure textual-based query search would therefore rank the pool game above the Mail app, it is likely that a user entering the "email" query would prefer the reverse ranking.

As further described below, remote server 150 can identify other indicator terms related to the search-query term of "email". Thus, e.g., "account," "reply," "message," "filter," and "compose" can all be identified as related indicator terms. A search or ranking sensitive to these related indicator terms can therefore identify the Mail app document 170a as being more relevant to the "email" search as compared to the pool game app document 170b. Remote server 150 can transmit (e.g., wirelessly transmit) a search results (e.g., including information in documents 170) to device 105. In this instance, the search results can include data associated with the Mail app and not with the pool game app, or the search results can include data associated with both apps, though the pool game app can be ranked below the Mail app. Device 105 can present (e.g., display) some or all of the respective results to a user (e.g., in a list). A user can select an app of the displayed apps and further request a download of the app or purchase the app.

II. Device and Server

Figure 2:
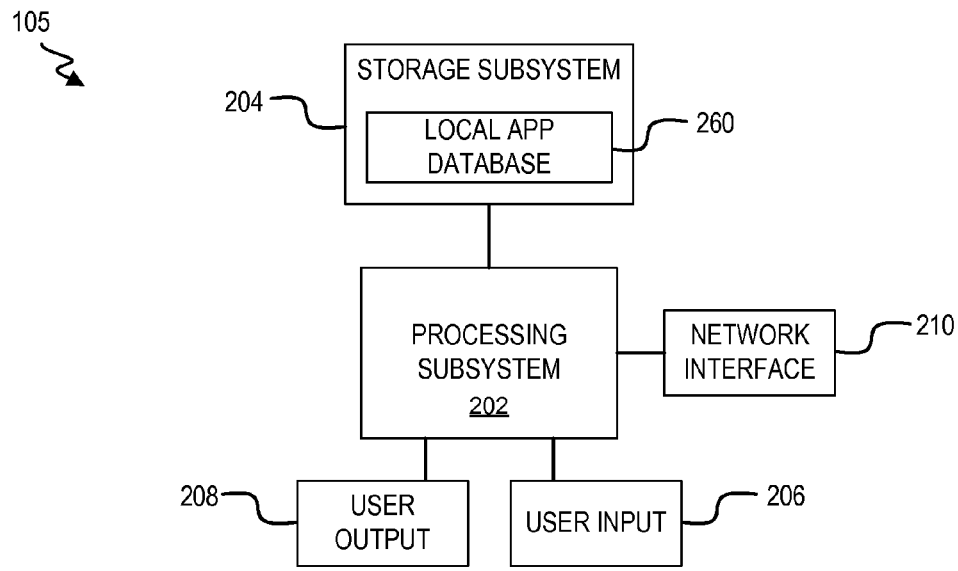
FIG. 2 is a simplified block diagram of an implementation of a device configured to receive user search queries according to an embodiment of the present invention.

FIG. 2 is a simplified block diagram of an implementation of device 105 configured to receive user search queries according to an embodiment of the present invention. Device 105 includes a processing subsystem 202, a storage subsystem 204, a user input device 206, a user output device 208, and a network interface 210.

Processing subsystem 202, which can be implemented as one or more integrated circuits (e.g., e.g., one or more single-core or multi-core microprocessors or microcontrollers), can control the operation of device 105. In various embodiments, processing subsystem 202 can execute a variety of programs in response to program code and can maintain multiple concurrently executing programs or processes. At any given time, some or all of the program code to be executed can be resident in processing subsystem 202 and/or in storage subsystem 204.

Through suitable programming, processing subsystem 202 can provide various functionality for device 105. For example, processing subsystem 202 can execute software (e.g., operating software) to allow a user to input search-query terms via user input device 206, to transmit search-query terms to remote server 150 via network interface 210, to view search results via user output, and/or interact with search results via user input device 206 and user output device 208 (e.g., to select, download or purchase a search-result app).

Processing subsystem 202 can further execute one or more apps identified in response to search queries, downloaded, and stored in a local app database 260.

Storage subsystem 204 can be implemented, e.g., using disk, flash memory, or any other storage media in any combination, and can include volatile and/or non-volatile storage as desired. In some embodiments, storage subsystem 204 can store one or more apps, stored in local app database 260, to be executed by processing subsystem 202. These apps can include apps downloaded by a user (e.g., via network interface 210) and apps identified based on search-query results. Programs and/or data can be stored in non-volatile storage and copied in whole or in part to volatile working memory during program execution.

A user interface can be provided by one or more user input devices 206 and one or more user output devices 208. User input devices 206 can include a touch pad, touch screen, scroll wheel, click wheel, dial, button, switch, keypad, microphone, or the like. User output devices 208 can include a video screen, indicator lights, speakers, headphone jacks, or the like, together with supporting electronics (e.g., digital-to-analog or analog-to-digital converters, signal processors, or the like). A user can operate input devices 206 to invoke the functionality of device 105 and can view and/or hear output from device 105 via output devices 208.

Network interface 210 can provide voice and/or data communication capability for device 200. For example, network interface 210 can provide device 105 with the capability of communicating with remote server 150. In some embodiments network interface 210 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), and/or other components. In some embodiments network interface 210 can provide wired network connectivity (e.g., Ethernet) in addition to or instead of a wireless interface. Network interface 210 can be implemented using a combination of hardware (e.g., antennas, modulators/demodulators, encoders/decoders, and other analog and/or digital signal processing circuits) and software components.

Figure 3:
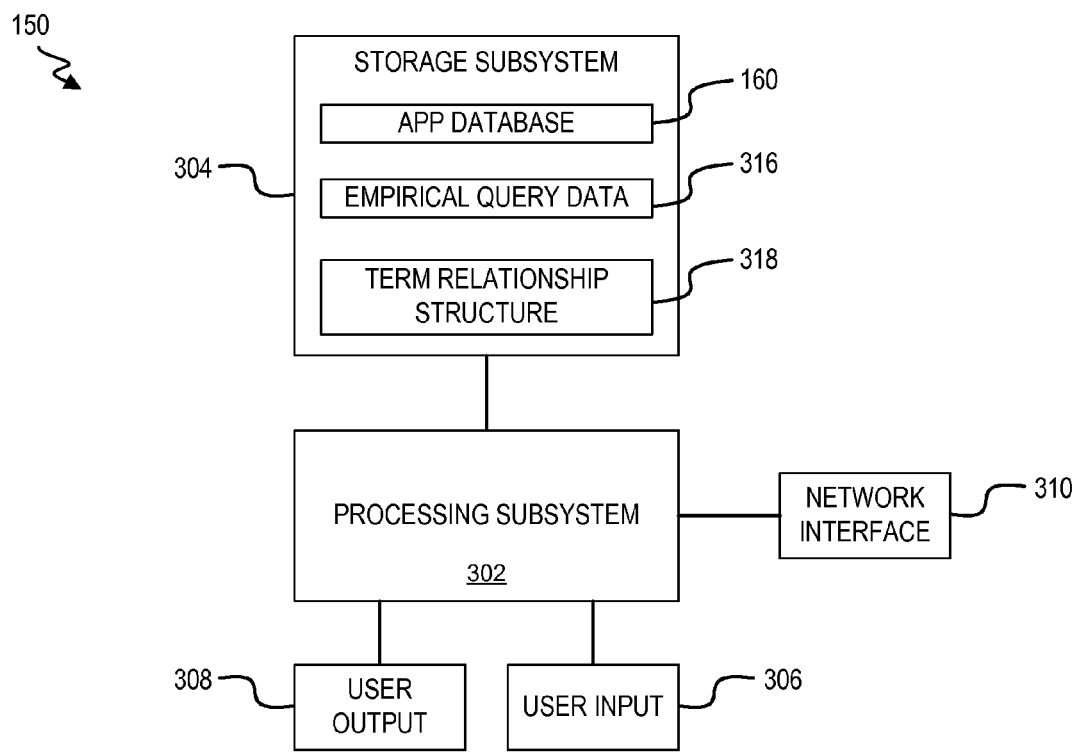
FIG. 3 is a simplified block diagram of an implementation of remote server for processing app searches according to an embodiment of the present invention.

FIG. 3 is a simplified block diagram of an implementation of remote server 150 for processing app searches according to an embodiment of the present invention. Remote server 150 includes a processing subsystem 302, storage subsystem 304, a user input device 306, a user output device 308, and a network interface 310. Storage subsystem 304, user input device 306, user output device 308 and network interface 310 can have similar or identical features as storage subsystem 204, user input device 206, user output device 208 and network interface 210 of device 105 described above.

Processing subsystem 302, which can be implemented as one or more integrated circuits (e.g., a conventional microprocessor or microcontroller), can control the operation of remote server 150. In various embodiments, processing subsystem 302 can execute a variety of programs in response to program code and can maintain multiple concurrently executing programs or processes. At any given time, some or all of the program code to be executed can be resident in processing subsystem 302 and/or in storage subsystem 304.

Through suitable programming, processing subsystem 302 can provide various functionality for remote server 150. Thus, remote server 150 can process search queries input at device 150 in order to identify search results. In some instances, processing subsystem 302 identifies the search results using one or more related indicator terms identified by the processing subsystem 302 at a previous time (e.g., during a training interval) or in real-time in response to a search query. Processing subsystem 302 can identify the related indicator terms by identifying a subset of documents from a set of documents (e.g., a training set or all documents available at a particular time point) stored within app database 160. The subset of documents can include those with an actual or potential search term or documents which users interacted with subsequent to receiving results for a comparable or same search term. The related indicator terms can be determined in advance of processing a search query (e.g., during a training interval) or in real-time in response to a search query. It will thus be understood that disclosures herein that refer to a potential search-query term or the like can also apply to an actual search-query term and the converse.

After the subset of documents is identified, processing subsystem 302 can identify the related indicator terms by determining which other terms occur within the subset of documents. In some instances, the subset of documents includes one or more search-query terms. Thus, determining other terms that occur within the subset of documents can amount to determining other terms that co-occur with the one or more search-query terms. Determination of the other terms can include, e.g., counting a number of documents within the subset that include a specific term or counting a total number of occurrences of a specific term within the document subset. The count can be normalized, e.g., based on a number of documents within the subset or a number of words (generally or of a particular type) in the subset. In some instances, the other related indicator terms are constrained to be of a particular type. For example, the constraint may indicate that the other related indicator terms must be a noun, must be a verb, or must be a noun or verb. The constraint may indicate that the other related indicator terms cannot be, e.g., an article, a preposition, an adverb or an adjective.

In some instances, the determination of related indicator terms can depend on empirical data, such as empirical data identifying users' interactions with search results. For example, the subset of documents can consist of or include those associated with search results that a user clicked on or selected for download following a search query including or consisting of a comparable or same search-query term. As another example, a document within a subset can be weighted according to a frequency which a user clicked on or selected for download the associated search result (e.g., across all searches or across search queries with a comparable or same search-query term), such that other words in documents associated frequently selected or downloaded apps are assigned relatively high weights. Thus, processing subsystem 302 can collect the empirical data and store it in an empirical query database 316. The empirical data can include search-query terms, search results responsive to the search query, and/or user interactions (e.g., clicked on results, view times, or downloaded apps) subsequent to receipt of the search results. Empirical query database 316 can be updated to remove or reduce the weight of older data and to add and/or weight newer data.

Processing subsystem 302 can store some or all term relationships in a data structure, such as a term relationship structure 318. Term relationship structure 318 can associate specific search-query terms with one or more other terms (e.g., potential related indicator terms). In some instances, the mere association of a search-query term with one or more other terms indicates that the other terms are indicator terms (e.g., indicative of an intent of a query) and/or related to the search-query term. For example, the associated other terms can include only those that satisfy a relatedness criterion, such as having a relatedness metric exceeding a threshold. In some instances, the other terms are assigned a weight to identify a degree to which they are related to the search-query term.

Term relationship structure 318 can include an array, such as a two-dimensional array. For example, the term relationship structure can include a list of terms related to each of a set of potential query terms. The list can be of a same or different length across the set of potential query terms. In some instances, term relationship structure 318 indicates a numeric relationship between each of a set of potential query terms and one or more second terms (e.g., each of a set of second terms). Term relationship structure 318 can include a sparse array, such that numeric relationships of "0" are not stored.

Search-query terms and/or other terms (e.g., potential or actual related indicator terms) can include a single word, a set of words or a phrase. For example, in some instances, processing subsystem 302 detects individual words within a search query and identifies, for each word, other terms (e.g., individual words, groups of words such as bigrams or trigrams or both individual words and groups of words) related to the individual words. In some instances, processing subsystem 302 detects a group of words (e.g., bigrams or trigrams) and identifies other terms related to the group of word. In some instances, processing subsystem 302 identifies other terms related to all words in a query and/or using a combination of techniques (e.g., identifying words related to each word, with each bigram, with each trigram, etc.). The related indicator terms and/or term relationship structure 318 can be updated periodically or continuously based on, e.g., new user input or new empirical data.

Using the related indicator terms information, processing subsystem 302 can then perform particular search query. Specifically, after receiving a search query, processing subsystem 302 can look up one or more indicator terms in term relationship structure 318 related to one or more terms in the search query. These indicator terms can be used while searching through a set of documents stored in app database 160. The set of documents used for real-time searches can be the same or can differ from the set of documents used to determine indicator terms. For example, the set of documents used to determine related indicator terms can include a sampling of documents or documents available at a past time point, whereas a set of documents used during a real-time search can include all available documents.

Processing subsystem 302 can expand a search query to include one or more related indicator terms. In some instances, a series of searches are performed. As one example, a first search may use the actual search-query term(s). A second search can search within results of the first search using most related indicator terms. A third search can search within results of the second search using next-most related indicator terms. As another example, a single search may use the actual search-query term(s) and related indicator terms. The related indicator terms may be weighted while performing the search.

The search can also be affected by non-textual properties, such as a user popularity of an app, an app price, or an app release date. Results from the search can include a list of documents (and/or associated apps or data) and can include a ranking of the documents.

Results from the search can be transmitted from remote server 150 to device 105 in one or more transmissions. Device 105 can present the search results to the user via the user output device 208. For example, for each search result, one or more of the following information types can be presented for the app: its name, publisher, price, category, brief description, number of downloads, average rating, device compatibility, size, version, update date, languages, screen shots, and/or user reviews. In some instances, some types of information are initially presented (e.g., in a list or grid presentation of the search results), and other types of information are available upon a user selecting a search resulting. For example, an initial list display can identify an "Mail" app, note its price, publisher and category. A user can then select (e.g., tap or click) on the app representation, and a brief description, number of downloads, average rating, device compatibility, size, version, update date, languages, screen shots and/or user reviews can be further presented for the app.

A user can choose to download one of the apps presented in the search results by interacting the with user input device 206. Device 105 can transmit a request for the app to remote server 150 via network interface 210. Device 105 can additionally (in a same or different transmission) or alternatively send other types of information, such as which apps the user selected to view an extended information profile. Remote server 150 can respond to the app request by transmitting the requested app to device 105 via network interface 310. In some instances, device 105 or remote server 150 can require, e.g., payment information (e.g., a credit-card number and expiration date, financial-system login information, and/or payment authorization) from a user prior to transmitting a request for the app to remote server 150, transmitting the app to device 105, or providing the app to the user. Remote server 150 can update its empirical query data 316 based on, e.g., the download request or other information that was provided (e.g., which apps were viewed).

It will be appreciated that device 105 and remote sever 150 described herein are illustrative and that variations and modifications are possible. A device 105 can be implemented as a mobile electronic device and can have other capabilities not specifically described herein (e.g., telephonic capabilities, power management, accessory connectivity, etc.). In a system with multiple devices 105 and/or multiple remote servers 150, different devices 105 and/or remote servers 150 can have different sets of capabilities; the various devices 105 and/or remote servers 150 can be but need not be similar or identical to each other.

Further, while device 105 and remote server 150 are described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Additionally, while device 105 and remote server 150 are described as singular entities, it is to be understood that each can include multiple coupled entities. For example, remote server 150 can include, a server, a set of coupled servers, a computer and/or a set of coupled computers.

III. Using Full Table of Terms

Figure 4:
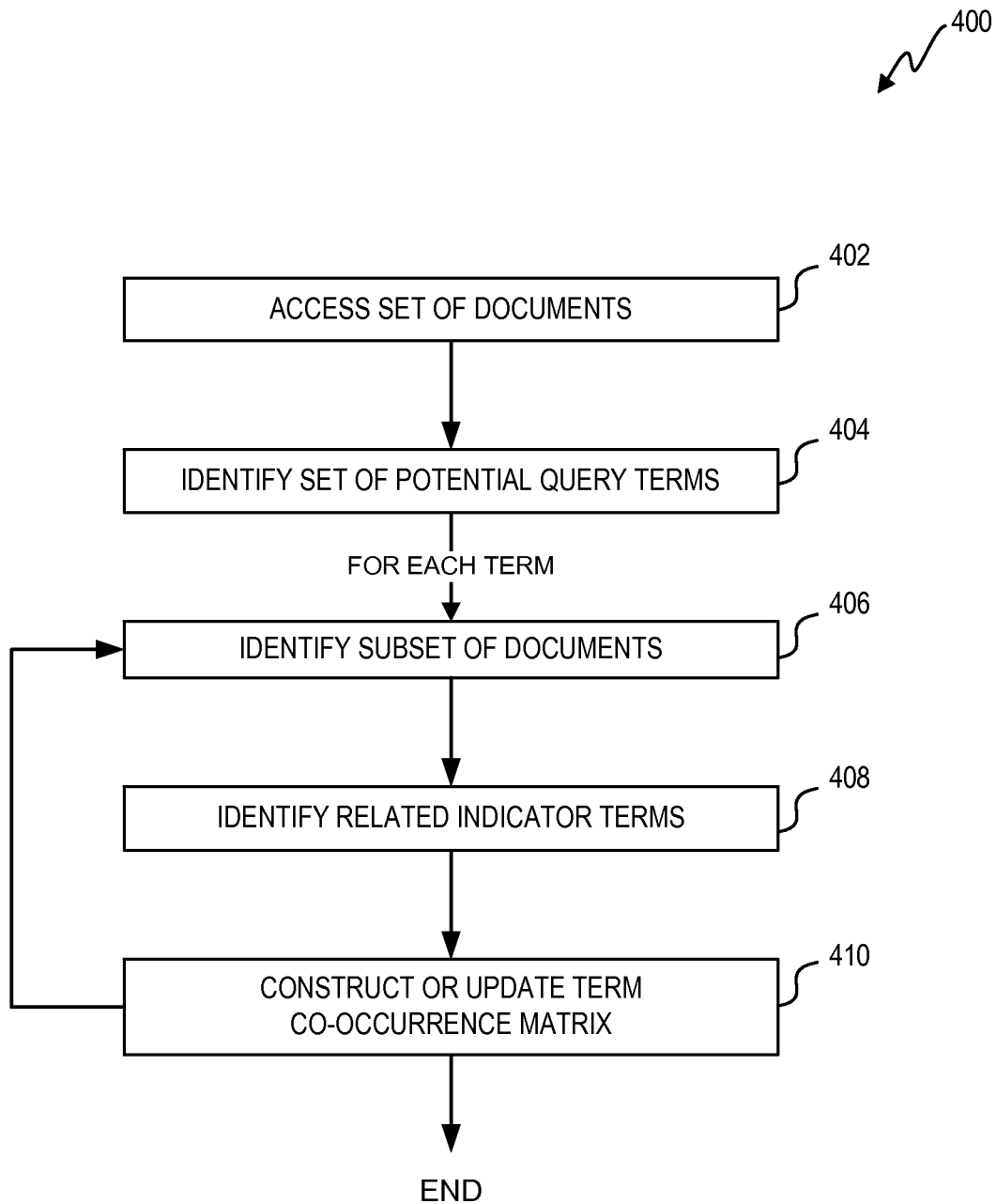
FIG. 4 is a flow diagram of a process for determining indiciatir terms related to query terms according to an embodiment of the present invention.

FIG. 4 is a flow diagram of a process 400 for determining indicator terms related to query terms according to an embodiment of the present invention. Process 400 can be implemented, e.g., in remote server 150 of FIG. 3. Process 400 can be performed to create a co-occurrence matrix of all the words (or a subset of substantive words, e.g., nouns and verbs) used in summaries (or other metadata) of apps in a database. The co-occurrence matrix can then be used to augment a search using a query term.

At block 402, a set of documents can be accessed (e.g., from app database 160). Each document within the set can be associated with a digital file, such as an app. The document can include textual data, such as a title or description of the digital file. The document can further indicate, e.g., the digital file's popularity, rating, availability date, number of times that users downloaded the digital file, number of times that users requested more information about the digital file, or a publisher.

The set of documents can include a real-time set or a stored set. For example, the set of documents can include some or all apps currently available to some or all users, or the set of documents can include some or all apps available to some or all users at a past time point. In some instances, the set of documents includes a sampling of available documents (e.g., a randomly selected or pseudo-randomly selected tenth of available documents). In some instances, the set of documents includes a training set, which can include documents associated with actual files or which can include documents associated with fictitious digital files.

At block 404, a set of potential query terms can be identified. In some instances, the potential query terms can include query terms frequently used by users during queries. For example, the potential query terms can be identified by consulting empirical query data 316 (e.g., query logs) and identifying terms which were entered by users more than an absolute or relative number of times (e.g., to identify the 5,000 terms most frequently entered by users). In some instances, the potential query terms include some or all terms within the set of documents. For example, the potential query terms can include all nouns and verbs in the set of documents, all nouns and verbs occurring more than an absolute or relative number of times in the set of documents, or all nouns and verbs occurring at least once in a threshold number of documents. The potential query terms can be constrained according to one or more threshold numbers of words. For example, a criterion can indicate that all potential query terms are to be of a specific word length (e.g., one word, two words or three words).

Blocks 406-410 be repeated for each identified potential query term. At block 406, a subset of documents can be identified. In some instances, the subset of documents is identified based on users' interactions with documents. For example, the subset of documents can include those associated with digital files (e.g., apps) for which users were likely to request additional information, click on or download. The subset of documents can be tied to interactions following comparable or same queries. As a specific illustrative example, if an identified query of interest is "pool game", the subset of documents can include the app descriptions for the 25 apps observed in the logs to be most-downloaded by users subsequent to issuing that same search query.

In some instances, the subset of documents can include documents within the set of documents that include the identified potential query term, that include the identified potential query term in a specified field (e.g., "title" or "description"), or that include the identified potential query term more than a threshold number of times.

At block 408, one or more related indicator terms can be identified. The related indicator terms can be identified using a relatedness metric. For a given term, the relatedness metric can indicate and/or can be influenced by a number of times that the term appears within the subset of documents, a number of documents within the subset of documents in which the term appears at least once, a word separation between the term and the identified potential query term within one or more of the subset of documents, and/or whether the term and identified potential query term appear within a same field in one or more of the subset of documents. The relatedness metric can be a normalized metric. For example, the metric can be normalized to constrain a top possible value, to constrain a sum of values across related indicator terms for a given potential query term, to account for a number of terms appearing within one or more documents, and/or to account for a number of documents in the subset of documents. The relatedness metric can be determined based on a weighted calculation. For example, an app associated with one document within the subset may have been downloaded by 50% of the users following entry of a search term, while an app associated with another document may have been downloaded by 10% of the users. Thus, terms in the first document may be weighted more heavily than terms in the second document.

As one particular example, a relatedness metric can be defined as a number of documents including both the identified potential query term and another term (e.g., a potential related indicator term) divided by a number of documents containing the identified potential query term and/or the other term. As another particular example, a relatedness metric can be defined as a number of documents including both the identified potential query term and another term divided by a number of documents containing the identified potential query term and/or the other term multiplied by an inverse-document-frequency term. The inverse-document-frequency can be defined as the log of the ratio of the number of documents in an analyzed set divided by the number of documents in the analyzed set including a term of interest.

Identification of related indicator terms can include assessing a criterion or comparing a relatedness metric to one or more thresholds. For example, a criterion can specify that related indicator terms are those associated with a relatedness metric above a threshold, or that related indicator terms include terms associated with the, e.g., 10 highest relatedness metrics for a particular potential query term. Thus, in some instances, a binary characterization of related indicator terms can be provided—either a term is related to a potential query term or it is not. In some instances, the binary characterization is provided along with a more detailed assessment. For example, a list of 20 related indicator terms can be identified, and each can be associated with a weight or relatedness metric to indicate how closely the indicator term is related to the potential query term. In some instances, no binary characterization is provided. Rather, a weight or relatedness metric can indicate how closely the indicator term is related to the potential query term.

At block 410, term relationship structure 318 is constructed or updated to reflect the related indicator terms. For example, term relationship structure 318 can be updated to add (e.g., to a list or table) new related indicator terms associated with the potential query term, to remove (e.g., from a list or table) terms from being associated with the potential query term that are no longer identified as being related, to change or add relatedness metrics between the potential query term and another term, etc.

Examples of term relationship structure 318 are shown in FIGS. 5A-5C. FIG. 5A shows an example in which term relationship structure 318 includes a list of words identified as being related to the potential query term of "Email". Thus, in this instance, term relationship structure 318 amounts to a vector, with each cell including a related indicator term. In some instances, the vector could be expanded to a matrix, e.g., such that each row corresponds to a different potential query term. Different potential query terms can be associated with a same or different number of related indicator terms. For example, the number can vary if a criterion indicates that a relatedness metric must exceed an absolute threshold prior to a characterization of being related. In some instances, multiple term relationship structures 318 exist (e.g., one associated with each potential query term).

FIG. 5B shows an example in which term relationship structure 318 includes a list of words identified as being related to the potential query term of "Email" and relatedness metrics associated with each related indicator term. Thus, in this illustrative example, "Compose" is identified as having a stronger relationship with "Email" as compared to "Filter.

FIG. 5C shows an example of a term relationship structure indicating a relatedness for multiple potential query terms. In this instance, a relatedness metric between each potential query term and each other potential query term is calculated and identified. Notably, the relatedness metrics are directional. For example, a potential search query term of "Email" has a relatedness metric of relative to another term of "Compose". Meanwhile, a potential search query term of "Compose" has a lower relatedness metric of relative to another term of "Email" (e.g., because "compose" may instead relate to musical-composition concepts).

Figure 6:
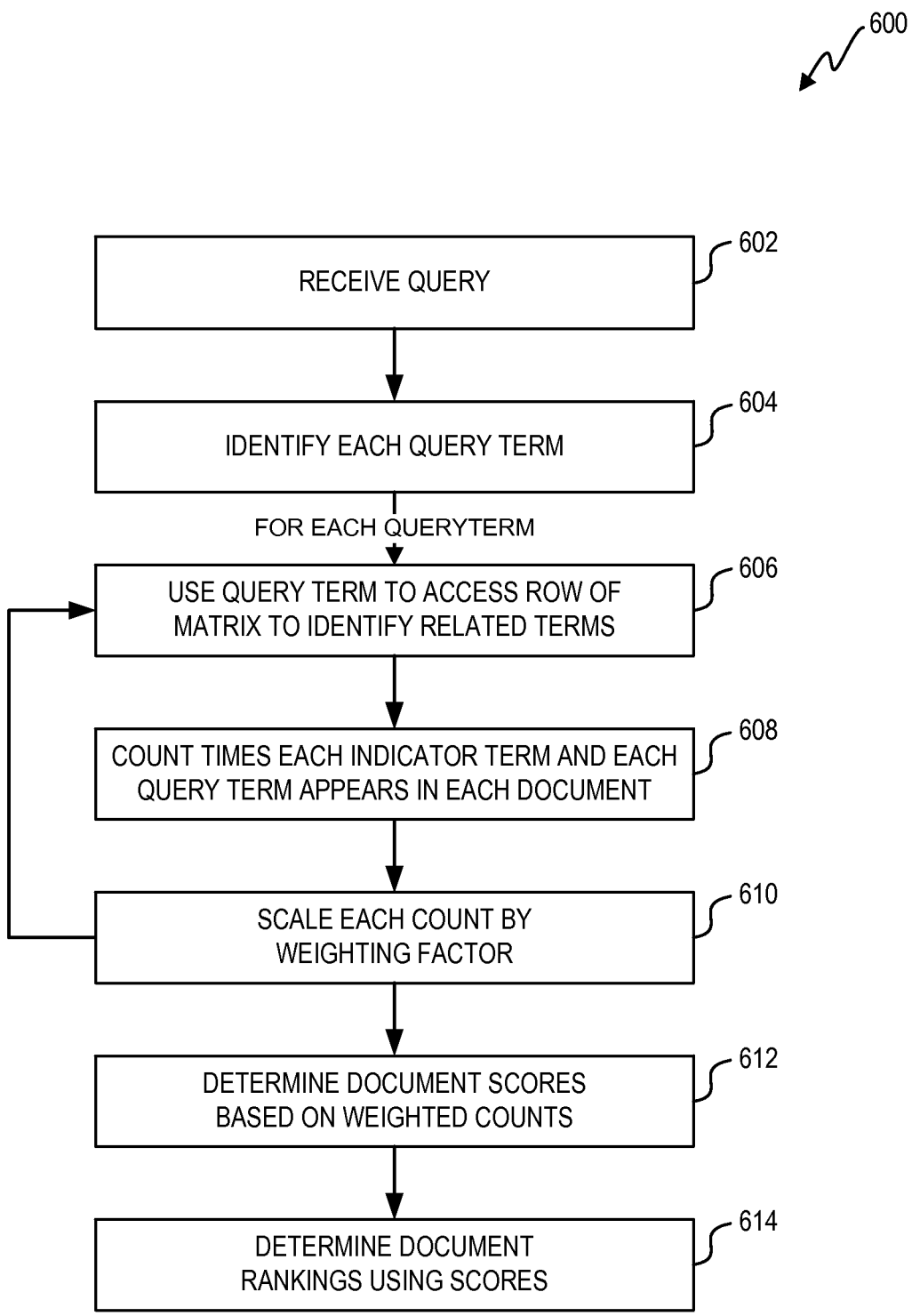
FIG. 6 is a flow diagram of a process for using a relationship structure to respond to a query.

FIG. 6 is a flowchart illustrating a method 600 for using a term relationship structure to respond to a query. Method 600 can be used to augment a search using a particular query term, e.g., by identifying a row of a co-occurrence matrix to determine additional query terms and weighting factors.

At block 602, a query can be received. The query can be indicative of a search for an app and can include one or more words. The query can be received at a server from a client device, such as a computer or mobile phone.

At block 604, each query term in the query can be identified. In some instances, a query term is a single word. For example, in a query of "how to make a cake", block 620 could include identifying five one-word terms or a subset of the five words (e.g., not including "a" and "to" as terms due to their non-substantive nature). In some instances, a query term includes a set of words, such as a bigram or trigram. The identified query terms can include overlapping words within the query. For example, terms identified for a query "speed read" could include both individual words and the pair of words.

Blocks 606-610 can be performed for each identified query term. At block 606, an identified query term can be used to access a row of a term relationship structure to identify related indicator terms. The related indicator terms can include those with relatedness metrics above a threshold or being non-zero. In some instances, the related indicator terms include n terms with the highest relatedness metrics.

At block 608, for each document within a set of documents, a number of times that each related indicator term and the query term appears can be counted. Thus, a query term with 10 related indicator terms could produce 11 counts. In some instances, separate counts are performed for separate sections of the document (e.g., a title versus a description At block 610, each count can be scaled by a weighting factor, e.g., to obtain a weighted count. The weighting factor can be determined based on the relatedness metric from the term relationship structure. Thus, the presence of an indicator term in a document that is highly related to a search-query term can be more heavily weighted than the presence of an indicator term with a weaker relation.

At block 612, a document score can be determined for each document based on the weighted count. The score can include a sum of the weighted counts associated with the document.

For example, in the example of the "speed read" query, if 10 indicator terms are identified as being related to each of the three query terms, then 33 weighted counts can be summed for each document. The score can further account for other factors. For example, the score can normalize counts based on a number of terms in a document or a frequency of the indicator term across a set of documents.

At block 614, document rankings can be determined using the document scores. For example, documents associated with larger scores can be assigned a lower ranking (e.g., being ranked closer to first) than documents associated with lower scores. The rankings can define an ordered list which can then be provided to a user who initiated the query.

IV. Using Empirical User Feedback

A potential difficulty of term analysis is identifying the potential query terms and potential indicator terms in the first place. Especially when multi-word terms are to be identified in search queries and to be identified as a related indicator term, many possible terms can be considered. This number can result in long processing times to consider each term. Terms can be identified based on those used in documents, but given a large document set, the term set can still be very large. In some instances, terms (e.g., indiciator terms) are identified based on terms in documents actually accessed by users. Thus, indicator terms important to users can be identified, while processing time can be constrained by ignoring infrequently used terms.

Figure 7:
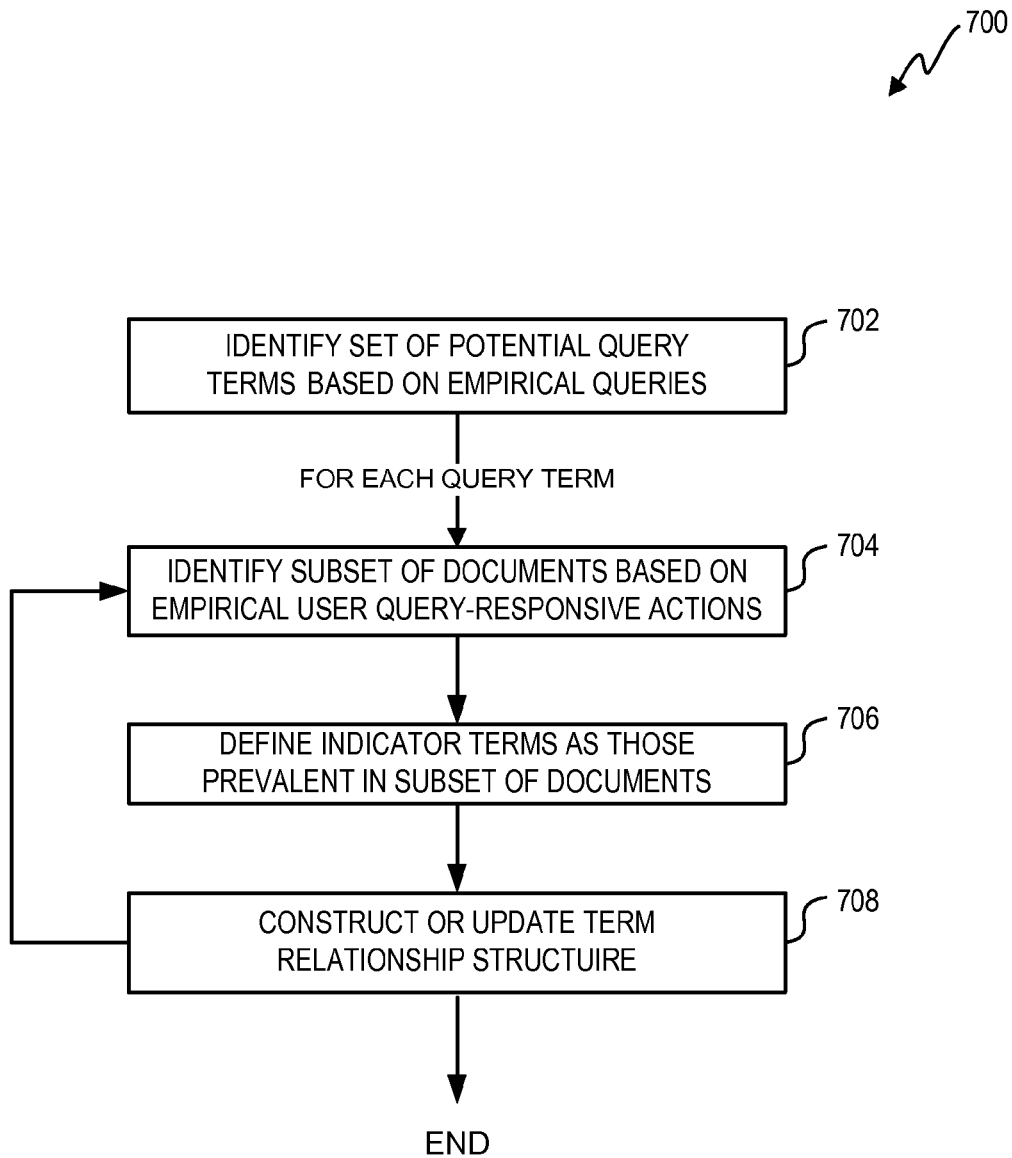
FIG. 7 is a flow diagram of a process for determining indiciator terms related to query terms according to an embodiment of the present invention.

FIG. 7 is a flow diagram of a process 700 for determining indicator terms related to query terms according to an embodiment of the present invention. Process 700 can be implemented, e.g., in remote server 150 of FIG. 3. Process 700 can include a more detailed implementation of process 400 shown in FIG. 4. Blocks with similar or same text can be performed in manners similar to that described with respect to FIG. 4.

At block 702, the set of potential query terms can be identified using empirical queries (e.g., stored as empirical query data 316). The set of potential query terms can include terms entered by other users in past queries. In some instances, the set of potential query terms is identified by parsing queries into terms of particular word lengths (e.g., into one-word terms, into two-word terms, etc.). For example, each of the following queries could favor defining a potential query term as "email": "Email", "email friends", "email app", "email management" and "email celebrities". In some instances, the set of potential query terms is defined based on exact matches compared to full queries. For example, in the above instance, only the "Email" query would favor defining the potential query term as "email". Other term-identification criteria can include identifying the most common query terms or identifying query terms with low success rates (e.g., such that users do not subsequently click on or download a provided search result).

Blocks 704-708 can be performed for each identified potential query term. At block 704, a subset of documents can be identified based on empirical user query-responsive actions for a specific query term. The subset of documents can be used to identify indicator terms related to the specific query term. The subset of documents can be identified as some of the documents in a set of documents, the set of documents being associated with all digital files presently and/or previously available to users. For example, the subset of documents can include documents associated with digital files that users were likely to download or request additional information about following a query.

As a specific example, subsequent to entry of an "email" search query, empirical query data 316 can indicate that search results included a Mail app 1, a Yourmail app, a Mymail app and a pool-game app. Empirical data 316 can further indicate that 15% of users downloaded the Mail app, 7% of users downloaded the Yourmail app, 4% of users downloaded the Mymail app, and 0% of users downloaded the pool-game app. The subset of documents can be defined to include the Mail, Yourmail and Mymail app (e.g., by comparing the percentages to a threshold) and to exclude the pool-game app.

By using empirical feedback, the universe of related documents is narrowed. Moreover, as the documents have a high functional relevance, the words in the documents will more likely be relevant to the query term. In this manner, underlying functional relationship can be identified, as opposed to loose relationships obtained simply from using the word in a document describing an app. Further, the subset of documents indicates practical relevance, indicating a degree to which a document was of interest to a user in the app context. This practical relevance can be advantageous to identify over relationships identified from other contexts or founded based on a theoretical basis.

At block 706, related indicator terms can be defined as those prevalent in the subset of documents. For example, the related indicator terms can include terms appearing in an above-threshold percentage of documents or appearing more than a threshold number of times within the documents.

At block 708, a term relationship structure can be constructed or updated to identify the related indicator terms. In some instances, block 708 includes adding the related indicator terms to a row, column or vector of the term relationship structure. In some instances, block 708 includes defining or updating a weighting factor associated with the term and the related indicator term.

Figure 8:
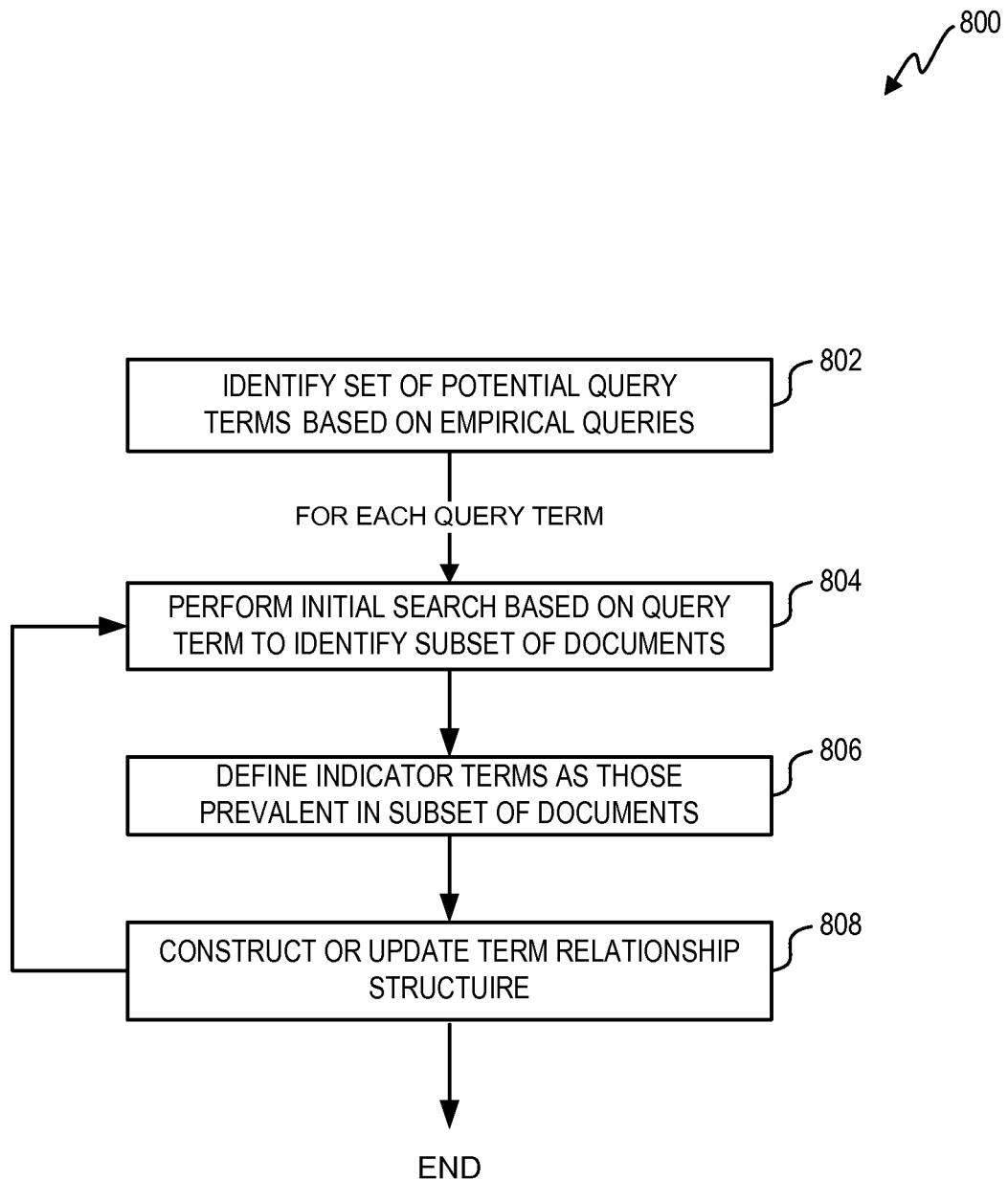
FIG. 8 is a flow diagram of a process for determining indiciator terms related to query terms according to an embodiment of the present invention.

FIG. 8 is a flow diagram of a process 800 for determining indicator terms related to query terms according to an embodiment of the present invention. Process 800 can be implemented, e.g., in remote server 150 of FIG. 3. Process 800 can include a more detailed implementation of process 400 shown in FIG. 4. Blocks with similar or same text can be performed in manners similar to that described with respect to FIG. 4 and/or FIG. 7.

At block 802, a set of potential query terms can be identified and can be identified, e.g., as described with respect to block 502.

At block 804, for each potential query term, the subset of documents can be identified by performing an a keyword lookup to retrieve documents containing the potential query term. The subset of documents can be identified as some of the documents in a set of documents, the set of documents being associated with all digital files presently and/or previously available to users or training documents. Block 804 can include, e.g., identifying a subset of documents within a set of documents associated with apps available to users on a previous day, the subset including documents including the potential query term at least once or at least a threshold number of times (e.g., generally or within one or more particular fields).

Blocks 806 and 808 then parallel blocks 706 and 708. However, the relatedness metric in this instance may also account for inter-term factors such as a number of words separating a potential query term and another potential indicator term. While, e.g., process 700 can include similar influences, such techniques can be less reliable in those instances due to a reduced assuredness that each document within the subset of documents will include the potential query term.

Figure 9:
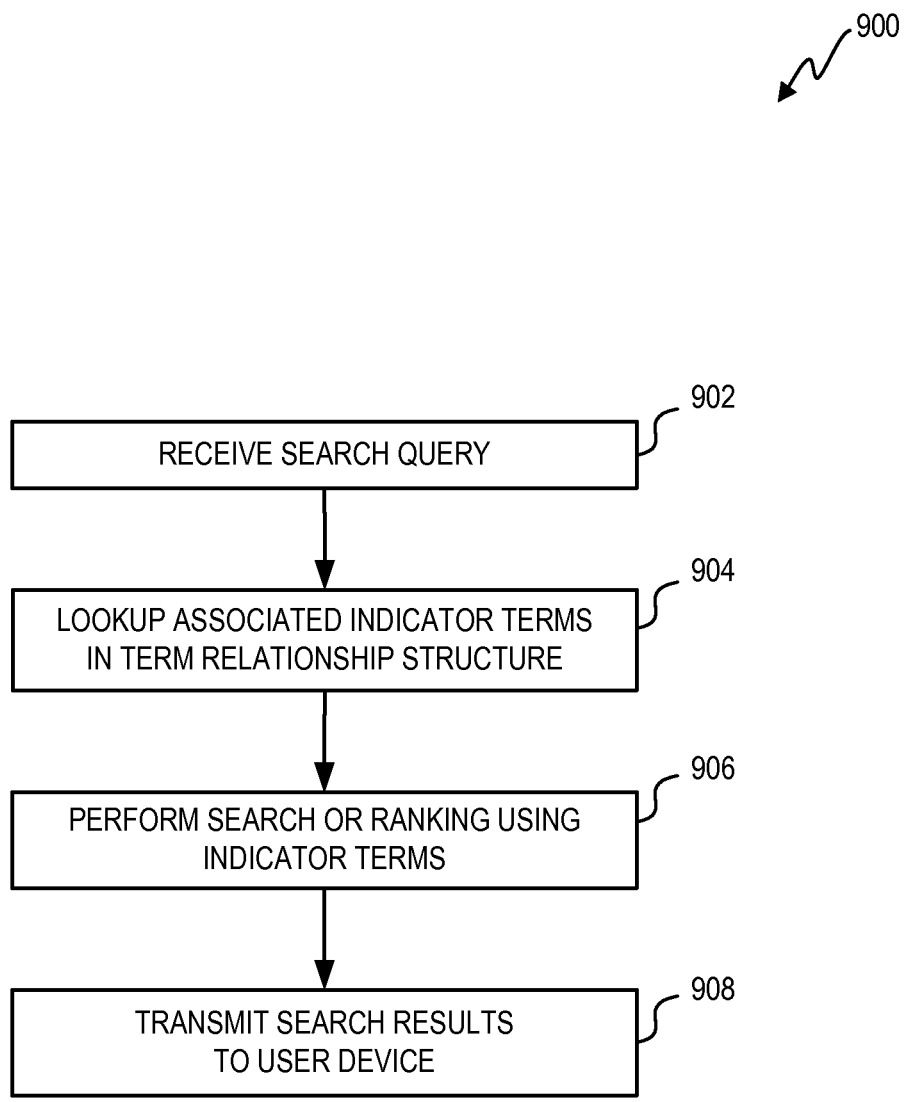
FIG. 9 is a flow diagram of a process for performing a search for a digital file according to an embodiment of the present invention.

FIG. 9 is a flow diagram of a process 900 for performing a search for a digital file according to an embodiment of the present invention. Process 900 can be implemented, e.g., in remote server 150 of FIG. 3.

At block 902, a search query is received from a user device 105. The search query can include and/or consist of one or more query terms.

At block 904, the one or more query terms can be used to lookup associated related indicator terms in a term relationship structure. As a result of block 904, one or more related indicator terms can be identified, each of which—in some instances—can be associated with a relatedness metric or weight (e.g., the weight depending on the relatedness metric).

As an example, a query term (e.g., a unigram or bigram) can be used to retrieve a row/column or other set of data where indicator terms related to the search term is stored. In one implementation, the term can be hashed to provide a direct memory address for retrieving the related indicator terms. In another implementation, the hash can be used to access an index table for obtaining the memory address. The size of data to be retrieved can also be stored in the index table.

At block 906, a search is performed. In one instance, an initial search can be performed using the one or more terms in the search query. Results of the initial search can be refined (e.g., pruned, ranked or re-ranked) using related indicator terms identified at block 904. In one instance, a single search (e.g., and ranking) is performed using the one or more terms in the search query and the related indicator terms identified at block 904. The related indicator terms can be weighted, such that a document including a highly weighted related indicator term can be preferred over a document including a less highly weighted related indicator term.

At block 908, the search results can be transmitted to user device 105. The search results can include an ordered list of digital file, a group of documents associated with digital files, or data from a group of documents associated with digital files. In some instances, the related indicator terms are also transmitted to user device 105.

User device 105 can then present the search results to the user, e.g., as a linear list or grid-style list. The search results can be presented in a manner that allow for the user to interact with one or more results. For example, a user may be able to select one search result, and additional information about the selected search result can be presented (e.g., on a new page, a pop-up window or on a current page). As another example, a user may be able to request a download of a search-result app. In some instances, downloading an app (e.g., an app that is not free) can require purchasing the app. Data about these additional interactions can be transmitted back to remote server 150, e.g., such that empirical query data 316 can be updated.

Some disclosed embodiments illustrate a multi-step process: first, a term relationship structure created to identify terms related to potential search-query terms; and second, a search is performed using the related indicator terms. It will be understood that the disclosures can be extended to embodiments in which these processes are performed nearly simultaneously. For example, upon receiving a search-query term, a term relationship structure can be constructed or updated to identify related indicator terms in real-time, and a search can then be performed using the related indicator terms.

Embodiments described herein can efficiently and effectively respond to users' search queries. Textual-based searches can have multiple limitations. First, textual-based searches tied to exact terms in users' queries can overlook potential search results that relate to a user's concept of interest but that do not include the exact terms. Users are forced to express their search queries in a finite number of words, and thus, any given query can (intentionally or accidentally) omit terms that would produce search results still of interest to the user. Second, textual-based searches can return search results that are not of interest to the user but happen to include search-query terms within associated documents. For example, incidental terms in descriptions can give rise to identification of the documents as pertaining to the search.

Meanwhile, embodiments herein can extend searches beyond the precise vocabulary used within a query. Related indicator terms can be identified based on terms appearing within documents estimated to be of most actual interest to users (e.g., by assessing their click-through and downloading activity) or based on terms that frequently co-occur with search-query terms. This process can be performed offline, such that related indicator terms can be immediately identified upon receipt of a query. Search results can be identified, refined and/or ranked in accordance with the related indicator terms. Therefore, search results can be more likely to match users' expectations.

Many disclosures herein are tied to search queries for apps. It will be appreciated that the disclosures can be extended to search queries pertaining to other digital files (e.g., content files), such as audio files (e.g., music files or podcast files) and/or video files.

A number of processes are disclosed herein. The processes can be performed in part or in their entireties by a computer, processor, electronic circuit, etc. Thus, each process block can, in some embodiments, be performed by, e.g., a computer.

Portions of the description can refer to particular user interfaces, such as touchscreen displays. Other embodiments can use different interfaces. For example, a user interface can be voice-based, with the user speaking instructions into a microphone or other audio input device and the device providing an audible response (e.g., using synthesized speech or pre-recorded audio clips). A combination of voice-based and visual interface elements can be used, and in some embodiments, multiple different types of interfaces can be supported, with the user having the option to select a desired interface, to use multiple interfaces in combination (e.g., reading information from the screen and speaking instructions) and/or to switch between different interfaces. Any desired form of user interaction with a device can be supported.

Embodiments of the present invention can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes can use different techniques, or the same pair of processes can use different techniques at different times. Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded and stored on various computer readable storage media; suitable media include magnetic disk or tape, optical storage media such as compact disk (CD) or DVD (digital versatile disk), flash memory, and other non-transitory media. Computer readable media encoded with the program code can be packaged with a compatible electronic device, or the program code can be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method of responding to a search query requesting relevant software applications from a database storing a set of documents, each document being associated with a software application, the method comprising:
    identifying, with a set of one or more servers, a subset of documents within the set of documents based on empirical user actions, the empirical user actions involving selecting a software application associated with the subset in response to receiving results for queries including a first query term;
    identifying a second term that occurs within the subset of documents;
    updating, with the set of one or more servers, a data structure to associate the first query term with the second term;
    receiving, at the set of one or more servers, the search query from an electronic device of a user, the search query including the first query term;
    accessing, with the set of one or more servers, the data structure to identify the second term associated with the first query term; and
    searching, with the set of one or more servers, documents within the database to identify relevant software applications based on the first query term and the second term.

2. The method of claim 1 wherein the subset of documents includes documents associated with applications downloaded by users subsequent to receiving the results for the queries including the first query term.

3. The method of claim 1 wherein the subset of documents includes documents associated with applications selected by users for more information subsequent to receiving the results for the queries including the first query term.

4. The method of claim 1, further comprising identifying the first query term by analyzing a set of search queries, each search query being from an electronic device of a respective user.

5. The method of claim 1, wherein searching documents within the database to identify relevant software applications comprises identifying whether a document within the database includes both the first query term and the second term.

6. The method of claim 1, wherein searching the database for relevant software applications comprises applying a weighting factor being indicative of a relationship between the first query term and the second term to a portion of documents across the documents within the database that include both the first query term and the second term.

7. The method of claim 1, wherein the data structure includes a two-dimensional array with numeric values indicating a relationship between a first set of terms and a second set of terms, the first set of terms including the first query term and the second set of terms including the second term.

8. The method of claim 1, wherein the second term is identified as being related to the first query term by comparing a relatedness metric associated with the first query term and the second term to a threshold.

9. The method of claim 1, wherein the data structure includes a list of second terms defined as being related to the first query term, the list of second terms including the second term.

10. A non-transitory computer readable medium storing a plurality of instructions that when executed control a computer system to perform a method to a search query requesting relevant software applications from a database storing a set of documents, each document being associated with a software application, the method comprising;
    identifying, with a set of one or more servers, a subset of documents within the set of documents based on empirical user actions, the empirical user actions involving selecting a software application associated with the subset in response to receiving results for queries including a first query term;
    identifying a second term that occurs within the subset of documents;
    updating, with the set of one or more servers, a data structure to associate the first query term with the second term;
    receiving, at the set of one or more servers, the search query from an electronic device of a user, the search query including the first query term;
    accessing, with the set of one or more servers, the data structure to identify the second term associated with the first query term; and
    searching, with the set of one or more servers, documents within the database to identify relevant software applications based on the first query term and the second term.

11. A method of defining a data structure to use for expanding a search query requesting relevant software applications from a database storing a set of documents, each document being associated with a software application, the method comprising:
    identifying, with a set of one or more servers, a subset of documents within the set of documents based on empirical user actions, the empirical user actions involving selecting a software application associated with the subset in response to receiving results for queries including a first query term;
    identifying a set of second terms;
    for each second term:
        determining, with the set of one or more servers, how frequently the second term occurs within the subset of documents;
        defining, with the set of one or more servers, a relatedness metric between the first query term and the second term based on the determined occurrence frequency; and
    constructing the data structure that indicates the relatedness metric between the first query term and each second term in the set of second terms.

12. The method of claim 11, constructing the data structure comprises updating an existing data structure.

13. The method of claim 11, wherein the data structure includes a sparse numeric array.

14. The method of claim 11, wherein determining how frequently the second indicator term occurs within the subset of documents includes determining a percentage of the subset of documents include the second term.

15. The method of claim 11, wherein the relatedness metric is normalized based on a prevalence of an associated second term across the subset of documents.

16. The method of claim 11, further comprising:
receiving, at the set of one or more servers, a search query from an electronic, device of a user, the search query including the first query term;
accessing, with the set of one or more servers, the data structure to identify second terms related to the first query term, the set of second terms including the identified second terms; and
searching, with the set of one or more servers, documents within the database to identify relevant software applications based on the first query term and the identified second terms.

17. The method of claim 16, wherein the identified second terms is a subset of the set of second terms, the relatedness metrics between each second term of the identified second terms and the first query term being higher than relatedness metrics between other second terms and the first query term, the other second terms being in the set of second terms but not being an identified second term.

18. A non-transitory machine readable medium storing executable program instructions which, when executed by a data processing system, cause the data processing system to perform a method for performing a search for software applications, each of those software applications being associated with a document in a set of documents in a database, and the search being performed with a first query term which was used to identify a subset of documents within the set of documents based on empirical user actions, the empirical user actions having involved selecting a software application associated with the subset in response to receiving results for queries that included the first query term, the method comprising:
receiving a search query from a device of a user, the search query including the first query term;
accessing a data structure which associates the first query term with at least a second term, wherein the second term has been identified to occur within the subset of documents;
searching documents in the database to identify software applications based on the first query term and the second term.

19. The medium of claim 18 wherein the subset of documents includes documents associated with applications downloaded by users subsequent to receiving the results for the queries including the first query term.

20. The medium of claim 18 wherein the subset of documents includes documents associated with applications selected by users for more information subsequent to receiving the results for the queries including the first query term.

21. The medium of claim 18, further comprising identifying the first query term by analyzing a set of search queries, each search query being from an electronic device of a respective user.

22. The medium of claim 18, wherein searching documents within the database to identify relevant software applications comprises identifying whether a document within the database includes both the first query term and the second term.

23. The medium of claim 18, wherein searching the database for software applications comprises applying a weighting factor being indicative of a relationship between the first query term and the second term to a portion of documents across the documents within the database that include both the first query term and the second term.

24. The medium of claim 18, wherein the data structure includes a two-dimensional array with numeric values indicating a relationship between a first set of terms and a second set of terms, the first set of terms including the first query term and the second set of terms including the second term.

25. The medium of claim 18, wherein the second term is identified as being related to the first query term by comparing a relatedness metric associated with the first query term and the second term to a threshold.

26. The medium of claim 18, wherein the data structure includes a list of second terms defined as being related to the first query term, the list of second terms including the second term.

* * * * *